United States Patent
Yano

(10) Patent No.: US 9,719,509 B2
(45) Date of Patent: Aug. 1, 2017

(54) MOTOR DRIVEN COMPRESSOR AND MANUFACTURING METHOD THEREOF

(71) Applicant: KABUSHIKI KAISHA TOYOTA JIDOSHOKKI, Kariya-shi, Aichi-ken (JP)

(72) Inventor: Junya Yano, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 515 days.

(21) Appl. No.: 14/227,126

(22) Filed: Mar. 27, 2014

(65) Prior Publication Data

US 2014/0294628 A1    Oct. 2, 2014

(30) Foreign Application Priority Data

Mar. 28, 2013   (JP) .................. 2013-070303

(51) Int. Cl.
*F04C 29/00*   (2006.01)
*H02K 5/22*   (2006.01)
(Continued)

(52) U.S. Cl.
CPC ......... *F04C 18/0215* (2013.01); *H01R 13/40* (2013.01); *H02K 5/225* (2013.01);
(Continued)

(58) Field of Classification Search
CPC .......... F04C 2240/803; F04C 2240/808; F04C 2240/30; F04C 2240/52; F04C 18/0215; F04C 29/00; F04B 39/12; F04B 39/121; F04B 39/00; F04B 53/16; H02K 5/225; H02K 11/01; H02K 11/022; H02K 11/33;
(Continued)

(56) References Cited

U.S. PATENT DOCUMENTS 6,450,786 B1    9/2002 Koch et al.
6,619,933 B2 *  9/2003 Ikeda .................. F04B 39/06
                                                417/410.1
(Continued)

FOREIGN PATENT DOCUMENTS

DE      102004002696 A1   8/2004
DE         10141397 B4    5/2007
(Continued)

*Primary Examiner* — Nathan Zollinger
(74) *Attorney, Agent, or Firm* — Sughrue Mion, PLLC

(57) ABSTRACT

To provide a motor-driven compressor which suppresses heat generation, enables power saving, exerts excellent durability, lowers a manufacturing cost, and hardly produces a defective product. The motor-driven compressor according to the present invention comprises a cover. The cover includes a first connector portion, first and second wires, and first and second resin portions. The first and second wires include first and second terminal portions having a cylindrical shape, lead portions, and first and second lid portions that are supported at opening end portions of the first and second terminal portions. The first and second lid portions close the opening end portions of the first and second terminal portions, and thereby prevent an insulating resin from entering the first and second terminal portions.

6 Claims, 7 Drawing Sheets

(51) Int. Cl.
*H01R 13/40* (2006.01)
*F04C 18/02* (2006.01)
*H02K 11/00* (2016.01)

(52) U.S. Cl.
CPC .... *F04C 2240/52* (2013.01); *F04C 2240/803* (2013.01); *H02K 11/00* (2013.01); *Y10T 29/49009* (2015.01)

(58) Field of Classification Search
CPC . H02K 3/28; H02K 11/00; H01R 4/00; H01R 4/70; H01R 13/40; Y10T 29/49009
USPC ..... 417/410.5; 439/851, 852, 853, 854, 606, 439/76.1, 521, 926, 527, 607.01, 625; 310/71
See application file for complete search history.

(56) References Cited

U.S. PATENT DOCUMENTS

2004/0145860 A1   7/2004  Shindo
2006/0171127 A1*  8/2006  Kadoya ............ B29C 45/14377
                                                           361/752
2010/0074772 A1*  3/2010  Hoshino ................. F04B 35/04
                                                           417/410.1
2011/0175470 A1*  7/2011  Kinoshita ............... F04B 35/04
                                                           310/71
2012/0237376 A1*  9/2012  Kinoshita ............... F01C 21/10
                                                           417/423.7
2013/0034975 A1*  2/2013  Yoshida ............. H01R 13/2428
                                                           439/78
2013/0187490 A1   7/2013  Hennecke et al.

FOREIGN PATENT DOCUMENTS

| DE | 102010040875 A1 | 3/2012 |
| EP | 0626747 A2 | 11/1994 |
| EP | 1068455 B1 | 5/2006 |
| JP | 10-027632 A | 1/1998 |
| JP | 10054359 A  * | 2/1998 |
| JP | 2004-190547 A | 7/2004 |
| JP | 2009-295340 A | 12/2009 |

* cited by examiner

MOTOR DRIVEN COMPRESSOR AND MANUFACTURING METHOD THEREOF

TECHNICAL FIELD

The present invention relates to a motor-driven compressor, and a manufacturing method thereof.

BACKGROUND ART

Japanese Patent Laid-Open No. 2004-190547 discloses a conventional motor-driven compressor (simply referred to as compressor below). The compressor comprises a housing, an electric driving mechanism, a compression mechanism, and a motor drive circuit. The compression mechanism is driven by the electric driving mechanism to compress a refrigerant. The motor drive circuit drives the electric driving mechanism. The housing includes a housing body and a cover. The electric driving mechanism and the compression mechanism are accommodated in the housing body. The cover is fixed to the housing body. The cover forms an accommodation chamber that accommodates the motor drive circuit between the cover and the housing body. An inverter is employed as the motor drive circuit.

The cover includes a connector portion which is configured to be connected with an external connector. The connector portion includes a pair of metal wires, and an insulating resin for fixing the two wires to the cover. Each of the wires includes a terminal portion that is configured to be electrically connected to the external connector, and a lead portion that electrically connects the terminal portion to the motor drive circuit.

As also described in Japanese Patent Laid-Open No. 2009-295340, each of the wires is obtained by bending a metal flat plate. More specifically, each of the wires includes a flat plate portion having a plate-like shape that extends to a distal end side toward the external connector, and the lead portion that is connected with the flat plate portion on a proximal end side, extends toward the inverter, and also fixed to the insulating resin.

In the compressor, the two wires are subjected to insert molding in the insulating resin to obtain the cover where the two wires are arranged in the connector portion. When the external connector is connected with the connector portion of the cover, the two wires are connected to the external connector. Power can be thereby fed to the inverter from the external connector.

However, in the above conventional compressor, since each of the wires includes the flat plate portion having a plate-like shape, contact area between the flat plate portion and the external connector is not sufficient. Thus, a resistance value between the flat plate portion and the external connector is high, thereby disadvantageously generating heat especially when a high current flows and hindering power saving. When the compressor is mounted to, for example, a vehicle, friction occurs at a contact point between the flat plate portion and the external connector due to vibrations generated while the vehicle is running. Thus, there is a demand for an improvement in durability.

In order to increase the contact area between the wire and the external connector, a wire including a solid round pin may be employed. In this case, however, a manufacturing cost may be increased. Particularly, when the round pin is subjected to plating or welding, the above tendency becomes prominent due to an increase in working steps.

On the other hand, when a wire including a terminal portion having a hollow cylindrical shape is employed as the wire, the insulating resin having fluidity flows into the terminal portion at the time of forming the cover. Thus, a defective product is easily produced.

The present invention has been made in view of the aforementioned conventional circumstances, and an object thereof is to provide a motor-driven compressor which suppresses heat generation, enables power saving, exerts excellent durability, lowers a manufacturing cost, and hardly produces a defective product.

SUMMARY OF THE INVENTION

A motor-driven compressor according to the present invention comprises a housing, an electric driving mechanism, a compression mechanism that is driven by the electric driving mechanism to compress a refrigerant, and a motor drive circuit that drives the electric driving mechanism, the housing including a housing body that accommodates the electric driving mechanism and the compression mechanism, and a cover that is fixed to the housing body and forms an accommodation chamber for accommodating the motor drive circuit between the cover and the housing body, the cover including a connector portion which is configured to be connected with an external connector, the connector portion including a metal wire, and an insulating resin for fixing the wire to the cover, and the wire including a terminal portion that is configured to be electrically connected to the external connector, and a lead portion that electrically connects the terminal portion to the motor drive circuit, wherein the insulating resin is formed over the terminal portion and the lead portion, the terminal portion has a cylindrical shape, and a lid portion that is arranged on the lead portion side to close a lead portion end of the terminal portion is provided integrally with the terminal portion.

Other aspects and advantages of the invention will be apparent from embodiments disclosed in the attached drawings, illustrations exemplified therein, and the concept of the invention.

BRIEF DESCRIPTION OF THE DRAWINGS

The invention will be described in more detail along with the concept and advantages thereof by referring to the attached drawings and the detailed description of the preferred embodiments below.

DETAILED DESCRIPTION OF EXEMPLARY EMBODIMENTS

In the following, Embodiments 1 and 2 obtained by embodying the present invention are described by reference to the drawings.

Embodiment 1

Figure 1:
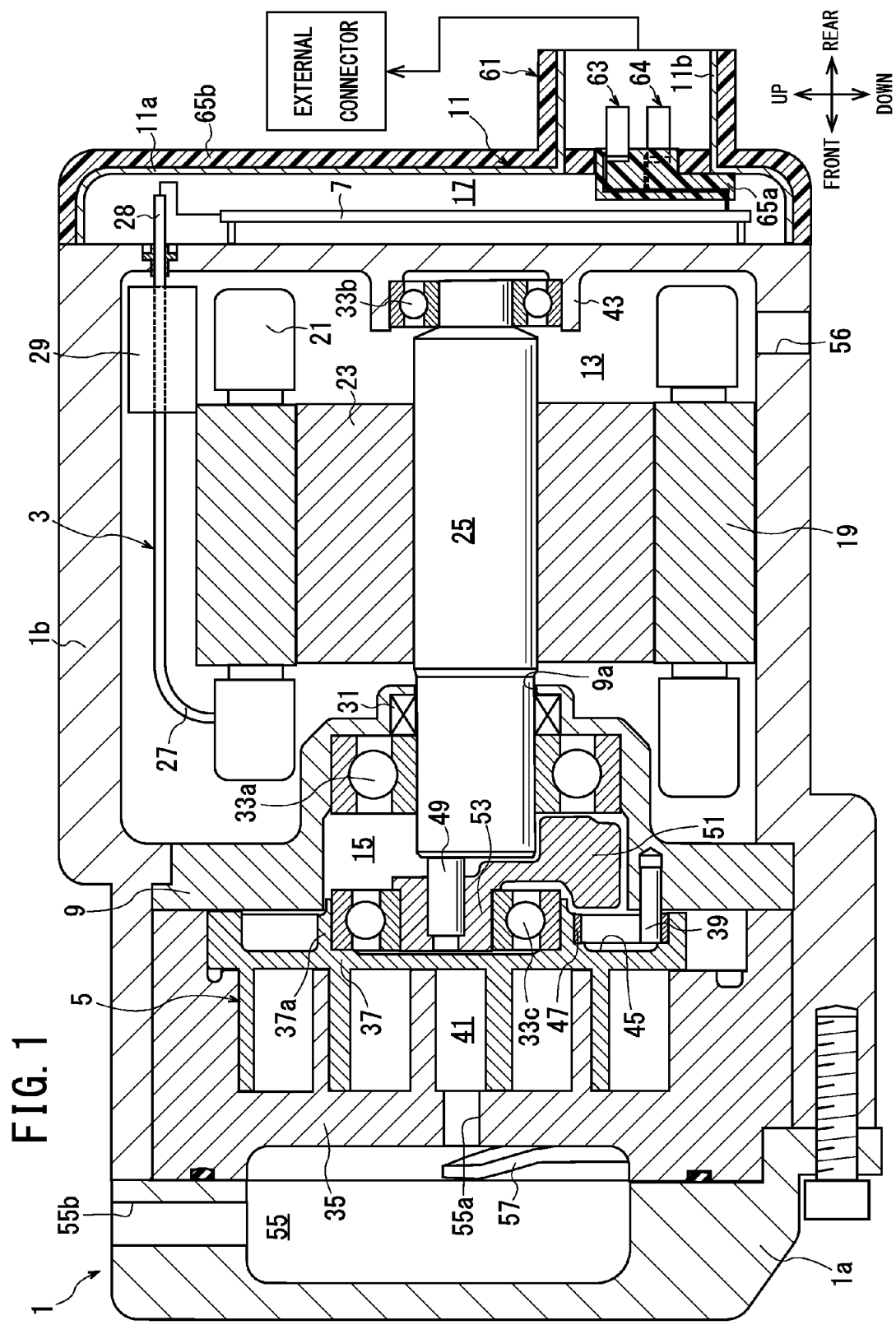
FIG. 1 is a sectional view of a compressor according to Embodiment 1.
Figure 2:
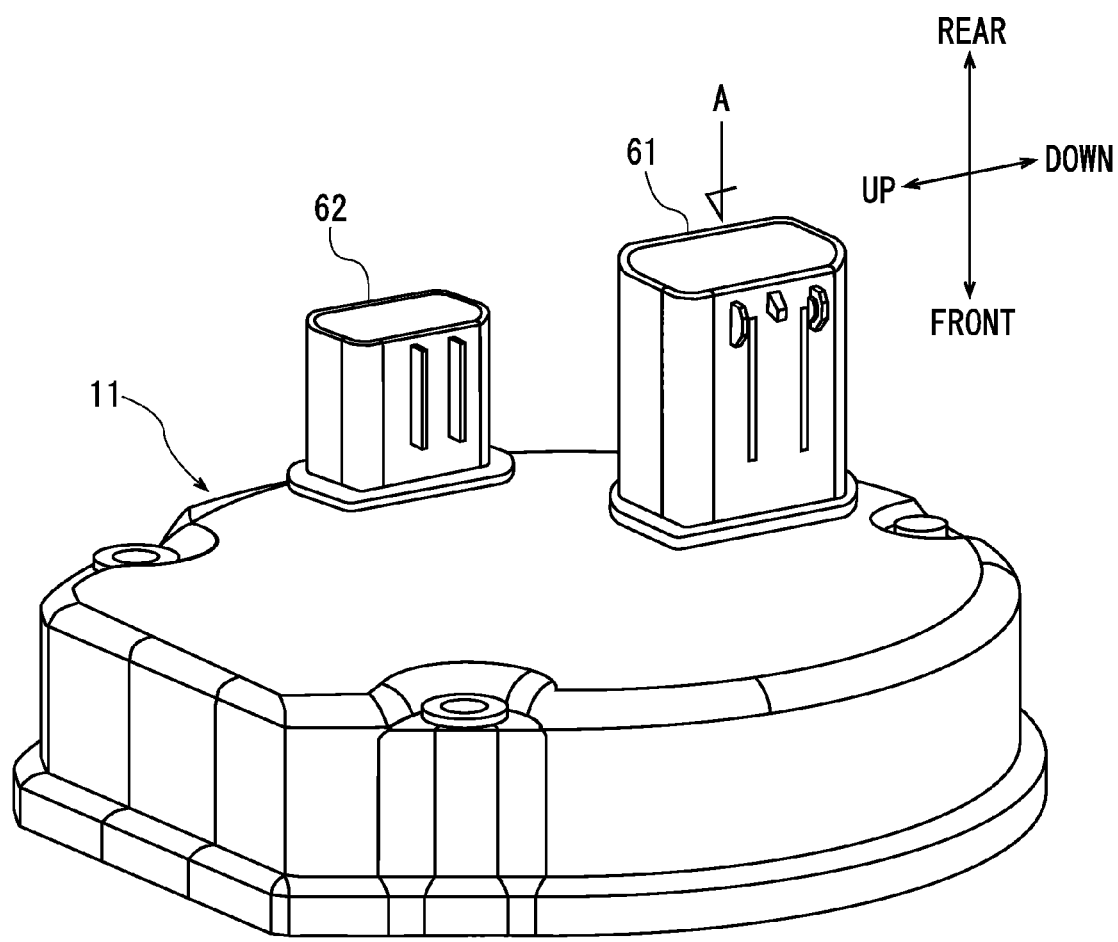
FIG. 2 is a perspective view of a cover of the compressor according to Embodiment 1.

A compressor according to Embodiment 1 is used for an air-conditioning apparatus that is mounted to a vehicle to perform temperature control of a vehicle interior. The compressor includes a housing 1, an electric driving mechanism 3, a compression mechanism 5, and a motor drive circuit 7 as shown in FIGS. 1 and 2. An inverter is employed as the motor drive circuit 7. The housing 1 includes a first housing 1a, a second housing 1b, and a cover 11. The first housing 1a and the second housing 1b correspond to a housing body.

As shown in FIG. 1, a fixed block 9 is supported within the second housing 1b. An inner portion of the first housing 1a and the second housing 1b is separated into a motor chamber 13 that is located on a rear side and an operation chamber 15 that is located on a front side by the fixed block 9. The compression mechanism 5 is accommodated in the operation chamber 15. The electric driving mechanism 3 is accommodated in the motor chamber 13. The cover 11 is fixed to the second housing 1b. The cover 11 forms an accommodation chamber 17 that accommodates the motor drive circuit 7 between the cover 11 and the second housing 1b.

The electric driving mechanism 3 includes a stator 19, a rotor 23, a drive shaft 25, a lead 27, and a cluster block 29. The stator 19 is fixed on an inner circumferential surface of the second housing 1b. The stator 19 has a coil 21. The rotor 23 that is fixed to the drive shaft 25 is provided inside the stator 19. The rotor 23 rotates integrally with the drive shaft 25. A center portion of the fixed block 9 projects backward. A shaft hole 9a is formed in the center of the fixed block 9. A shaft seal unit 31 and a bearing unit 33a are fitted to the fixed block 9 on a front side of the shaft hole 9a. A front side of the drive shaft 25 is inserted through the shaft hole 9a. A cylindrical boss portion 43 is provided projecting forward on a rear side of an inner surface of the second housing 1b. A bearing unit 33b is provided in the boss portion 43. A rear side of the drive shaft 25 is supported by the bearing unit 33b. The front side of the drive shaft 25 is supported by the bearing unit 33a. The drive shaft 25 is rotatably supported by the bearing units 33b and 33a. One end side of the lead 27 is connected to the cluster block 29. The other end side of the lead 27 is connected to the coil 21. The cluster block 29 is connected to the motor drive circuit 7 via a connection terminal 28.

The compression mechanism 5 includes a fixed scroll 35 that is fixed to an inner circumferential surface of the first housing 1a, and a movable scroll 37 that is arranged facing the fixed scroll 35. The movable scroll 37 is arranged between the fixed block 9 and the fixed scroll 35. The fixed scroll 35 and the movable scroll 37 mesh with each other to form a compression chamber 41 therebetween.

A cylindrical boss portion 37a is provided projecting backward in a center portion of a rear surface of the movable scroll 37. A plurality of rotation preventing holes 45 are also provided in an outer circumferential region of the rear surface of the movable scroll 37. A rotation prevention ring 47 is fixed to each of the rotation preventing holes 45. A plurality of rotation prevention pins 39 are provided projecting forward on a front surface of the fixed block 9. Each of the rotation prevention pins 39 rolls within each of the rotation prevention rings 47.

An eccentric shaft portion 49 is formed projecting at a front end portion of the drive shaft 25. The eccentric shaft portion 49 is rotatably inserted into a bushing 51 with a balancer that is provided between the fixed block 9 and the movable scroll 37. A bearing unit 33c is provided between a columnar portion 53 of the bushing 51 with a balancer and the boss portion 37a.

A discharge chamber 55 is formed between the fixed scroll 35 and the first housing 1a. A discharge port 55a that brings the compression chamber 41 and the discharge chamber 55 into communication is formed in the fixed scroll 35. A discharge reed valve (not shown) that opens and closes the discharge port 55a, and a retainer 57 that regulates a lift of the discharge reed valve are fixed to a front end surface of the fixed scroll 35. An outlet 55b that brings the discharge chamber 55 and the outside into communication is provided penetrating through the first housing 1a. An inlet 56 that brings the outside and the motor chamber 13 into communication is provided penetrating through the second housing 1b.

Figure 3:
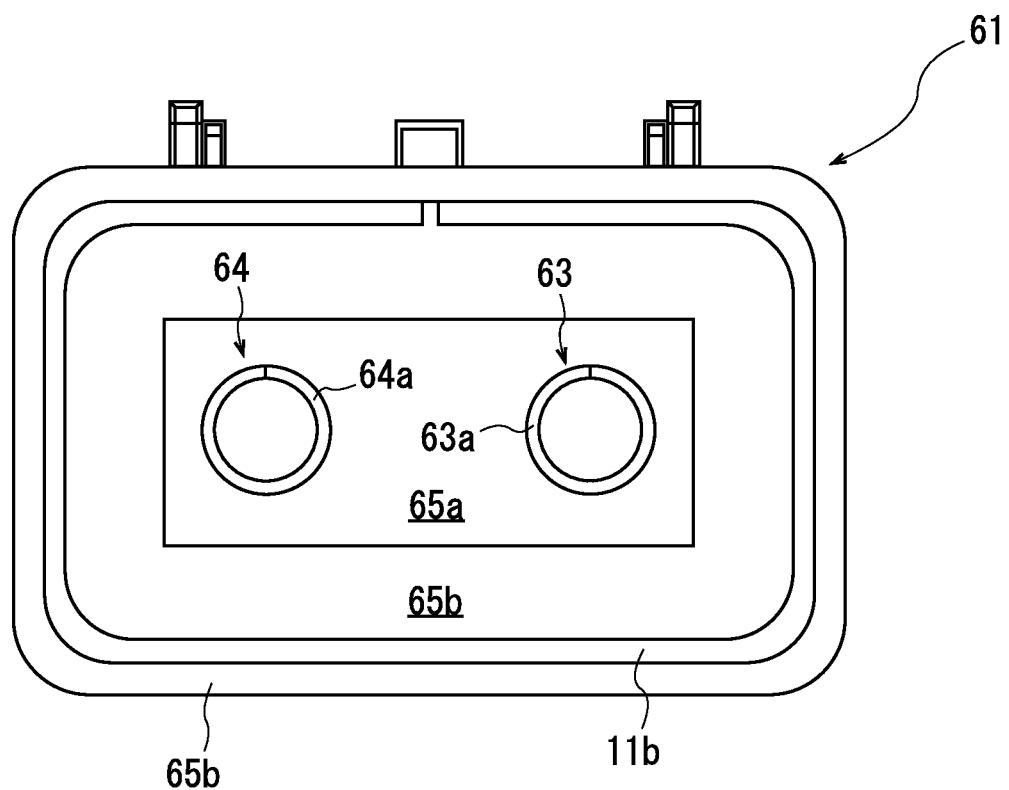
FIG. 3 is a plan view illustrating a connector portion as viewed from the direction of an arrow A in FIG. 2 of the compressor according to Embodiment 1.

As shown in FIGS. 1 to 3, a first connector portion 61 and a second connector portion 62 are formed projecting backward on the cover 11. The first connector portion 61 is used for feeding power to the motor drive circuit 7. The second connector portion 62 is used for connecting a signal line for detecting various states of the electric driving mechanism 3 and the compression mechanism 5.

The cover 11 includes a shield cover 11a that electromagnetically shields the accommodation chamber 17 as shown in FIG. 1. A shield connector 11b that electromagnetically shields the first connector portion 61 is fixed integrally with the shield cover 11a. First and second resin portions 65a and 65b made of an insulating resin are provided on an outer surface side of the cover 11 so as to cover the shield cover 11a and the shield connector 11b.

As shown in FIG. 3, first and second wires 63 and 64 are provided in the first connector portion 61. The first and second wires 63 and 64 are formed into a first molded article 75 by the first resin portion 65a in advance (see FIG. 9). The first molded article 75 is fixed together with the shield cover 11a and the shield connector 11b by the second resin portion 65b.

Figure 4:
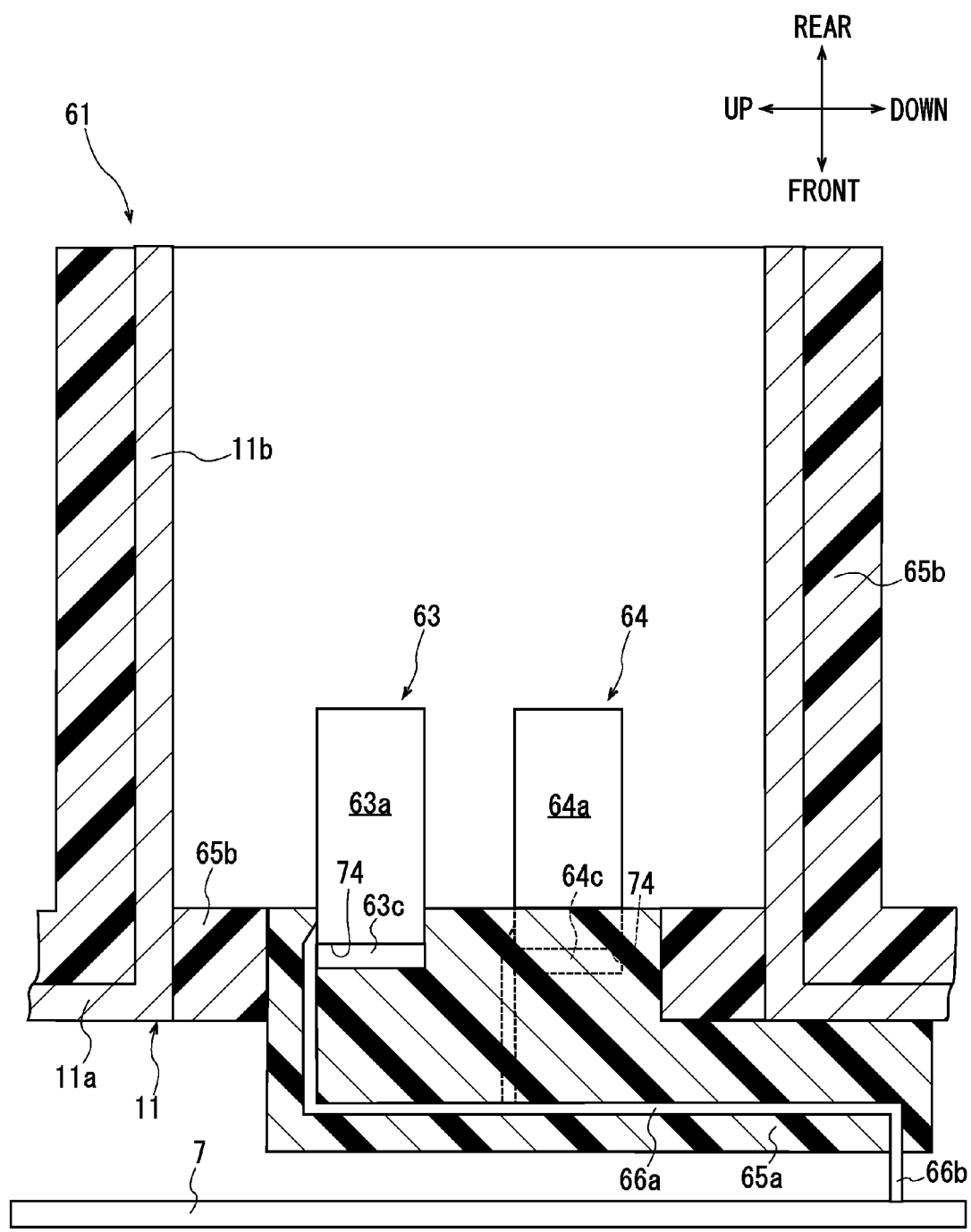
FIG. 4 is an enlarged sectional view of a main portion of the compressor according to Embodiment 1.

The first and second wires 63 and 64 respectively include first and second terminal portions 63a and 64a as shown in FIGS. 3 and 4. The first and second terminal portions 63a and 64a have a cylindrical shape extending to an axial distal end side toward an external connector. The first and second terminal portions 63a and 64a are respectively connected to lead portions 66a (only one of which is shown). First and second lid portions 63c and 64c that respectively close lead portion ends portions 74 of the first and second terminal portions 63a and 64a are provided on the first and second terminal portions 63a and 64a on the side of the lead portions 66a. Connection portions 66b (only one of which is shown) are respectively formed in the two lead portions 66a. The two connection portions 66b are connected to the motor drive circuit 7.

As shown in FIG. 1, the motor chamber 13 is connected to an evaporator (not shown) via a pipe that is connected to the inlet 56. The evaporator is connected to an expansion valve (not shown) via a pipe. The expansion valve is connected to a condenser (not shown) via a pipe. The discharge chamber 55 is connected to the condenser via a pipe that is connected to the outlet 55b. The compressor, the evaporator, the expansion valve, and the condenser constitute a refrigeration circuit of the vehicular air-conditioning apparatus.

Figure 5:
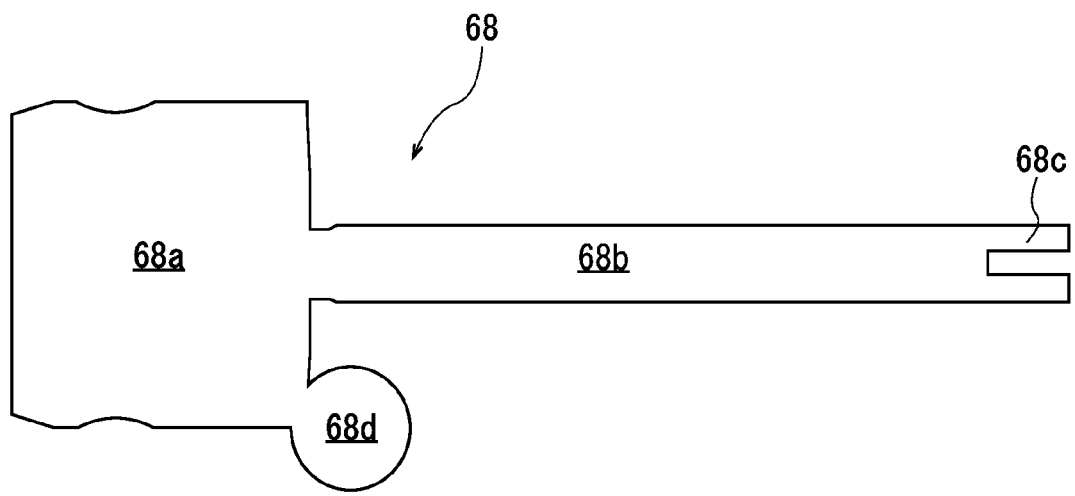
FIG. 5 is a plan view of a flat plate of the compressor according to Embodiment 1.

The compressor is manufactured as described below. First, as a preparation step, two metal flat plates 68 having conductivity (only one of which is shown) are prepared as shown in FIG. 5. Each of the flat plates 68 includes a head portion 68a having a substantially square shape, and a lead portion 68b that extends in a direction away from the center of one side of the head portion 68a. A bifurcated connection portion 68c is formed at a distal end of the lead portion 68b. Each of the flat plates 68 also includes a circular lid portion 68d at one corner of the head portion 68a on the side of the lead portion 68b.

Figure 6:
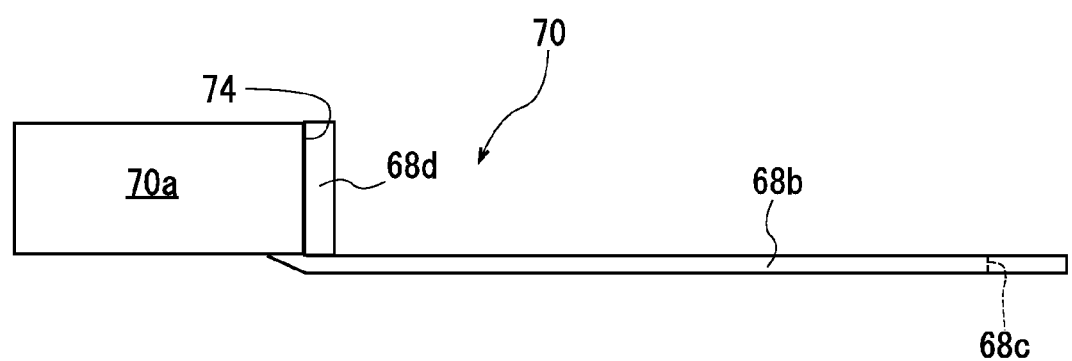
FIG. 6 is a side view of an intermediate component of the compressor according to Embodiment 1.

Subsequently, as a bending step, the head portion 68a of the flat plate 68 is bent in a cylindrical shape to form a terminal portion 70a as shown in FIG. 6, which terminal portion 70a will have an opening at an external connector end and at an opposite lead portion end 74. At this point, the center axis of the terminal portion 70a is made parallel to the lead portion 68b. The lid portion 68d is also bent so as to close the lead portion end 74 of the terminal portion 70a. An intermediate member 70 is thereby obtained.

Figure 7:
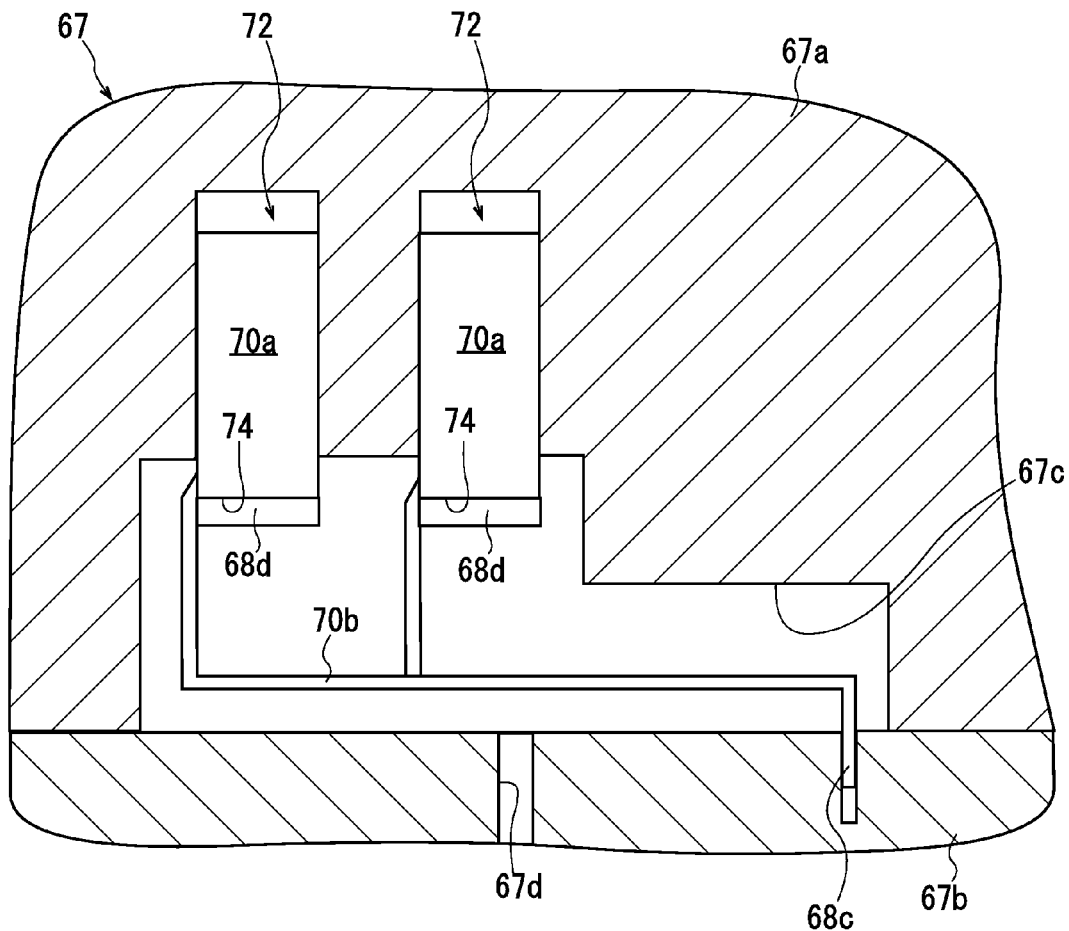
FIG. 7 is a sectional view of a first mold illustrating a method for manufacturing a compressor according to Embodiment 1.

Subsequently, a first injection mold 67 is prepared as shown in FIG. 7. The first injection mold 67 includes a first mold 67a and a second mold 67b. A first cavity 67c is formed between the first mold 67a and the second mold 67b. A gate 67d through which a molten resin of an insulating resin is injected is provided in the first cavity 67c.

Figure 8:
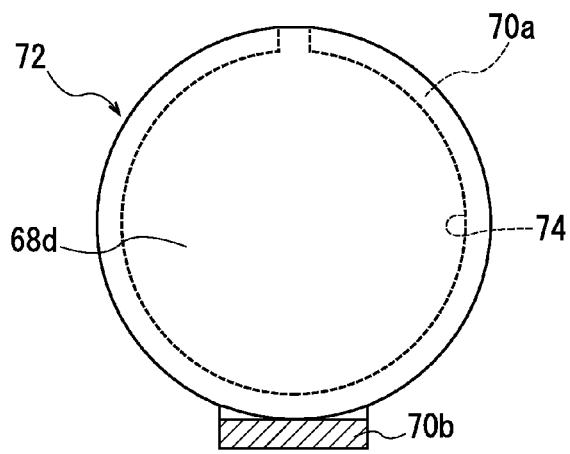
FIG. 8 is a partially-sectional rear view of a wire of the compressor according to Embodiment 1.
Figure 9:
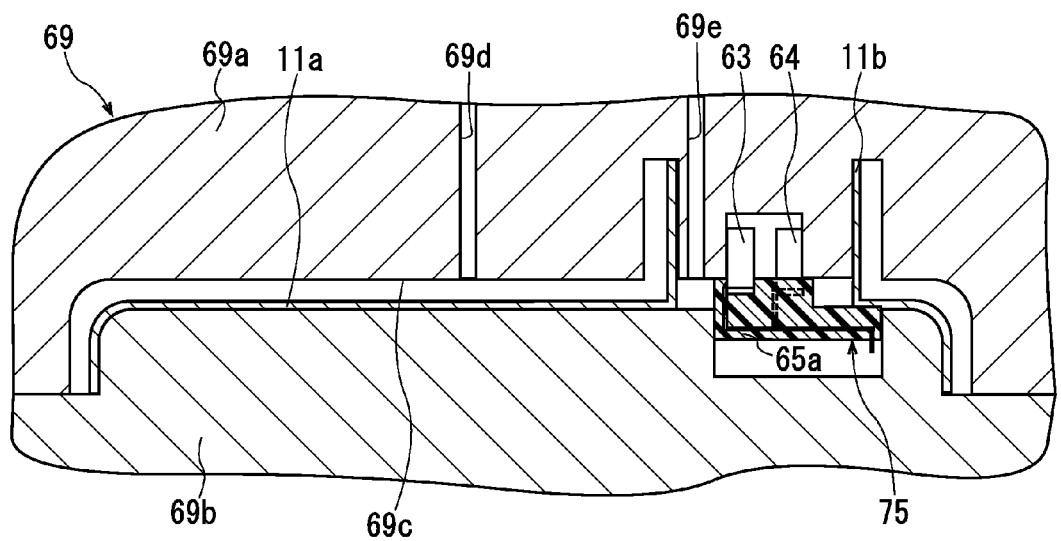
FIG. 9 is a sectional view of a second mold illustrating the method for manufacturing a compressor according to Embodiment 1.

Two intermediate members 70 are provided in the first cavity 67c. At this point, each of the lead portions 68b is bent perpendicular to the axial direction of the terminal portion 70a at a position apart a given distance from the terminal portion 70a. Each of the lead portions 68b is also bent parallel to the axial direction of the terminal portion 70a before the connection portion 68c. Pre-molded wires 72 each including the terminal portion 70a and a lead portion 70b that is bent at two points are thereby obtained. Subsequently, as a first injection step, a molten resin is injected into the first cavity 67c. At this point, the lid portion 68d prevents the molten resin from entering the terminal portion 70a as shown in FIG. 8. The first molded article 75 is thereby obtained as shown in FIG. 9. The first molded article 75 includes the first resin portion 65a obtained by solidifying the molten resin, and the first and second wires 63 and 64 obtained by fixing the two pre-molded wires 72 by the first resin portion 65a.

A second injection mold 69 is also prepared as shown in FIG. 9. The second injection mold 69 includes a third mold 69a and a fourth mold 69b. A second cavity 69c is formed between the third mold 69a and the fourth mold 69b. Gates 69d and 69e through which a molten resin of an insulating resin is injected are provided in the second cavity 69c.

The shield cover 11a, the shield connector 11b, and the first molded article 75 are provided in the second cavity 69c. Subsequently, as a second injection step, a molten resin is injected into the second cavity 69c. The cover 11 is thereby obtained as shown in FIG. 1. The cover 11 includes the second resin portion 65b, and the first molded article 75, the shield cover 11a, and the shield connector 11b that are fixed by the second resin portion 65b by solidifying the molten resin. Therefore, in the cover 11, the shield cover 11a and the shield connector 11b can be fixed by the insulating resin for fixing the first and second wires 63 and 64.

In the manufacturing method, the shield cover 11a and the shield connector 11b can be fixed by the second resin portion 65b after fixing the first and second wires 63 and 64 by the first resin portion 65a. Therefore, the cover 11 can be easily manufactured.

The motor drive circuit 7 is assembled into the cover 11 to obtain a first assembly. A second assembly is also prepared by assembling the electric driving mechanism 3 and the compression mechanism 5 into the first housing 1a and the second housing 1b. The first assembly is assembled on a rear side of the second assembly. The compressor according to the embodiment can be thereby manufactured.

In the compressor obtained as described above, the external connector is connected with the connector portion 61 of the cover 11. Accordingly, the first and second wires 63 and 64 (the first and second terminal portions 63a and 64a) are connected to external terminals (not shown) in the external connector. Therefore, in the compressor, power can be fed to the motor drive circuit 7 from the external connector.

In the compressor, power is fed to the coil 21 via the connection terminal 28, the cluster block 29, and the lead 27 from the motor drive circuit 7 when a driver of the vehicle operates the air-conditioning apparatus. The electric driving mechanism 3 is thereby operated to rotate the rotor 23 and rotate the drive shaft 25. The compression mechanism 5 is thereby operated to cause the movable scroll 37 to revolve. Thus, a refrigerant through the evaporator is suctioned into the compression chamber 41 from the motor chamber 13, compressed in the compression chamber 41, and discharged to the discharge chamber 55. The refrigerant in the discharge chamber 55 is discharged to the condenser, so that the vehicle interior is air-conditioned.

Here, in the compressor, the first and second wires 63 and 64 including the first and second terminal portions 63a and 64a are employed as shown in FIGS. 1 and 4. Therefore, a contact area between the first and second wires 63 and 64 and the external connector is larger than that of a wire including a flat plate portion having a plate-like shape. A resistance value between the first and second wires 63 and 64 and the external connector can be thereby decreased.

Since the compressor has a large contact area between the first and second wires 63 and 64 and the external connector, the first and second wires 63 and 64 and the external connector are hardly rubbed against each other even when vibrations are generated while the vehicle is running. Thus, friction is difficult to occur on the first and second terminal portions 63a and 64a of the first and second wires 63 and 64.

Moreover, since the first and second wires 63 and 64 including the hollow first and second terminal portions 63a and 64a are employed in the compressor, a manufacturing cost can be lowered as compared to a wire including a solid round pin.

As shown in FIG. 7, in the compressor, when the first and second wires 63 and 64 are subjected to insert molding in the insulating resin to form the first molded article 75 in the first injection step, the first and second lid portions 63c and 64c connected between the first and second terminal portions 63a and 64a and the lead portions 66a close the lead portion ends 74. Therefore, the insulating resin having fluidity is prevented from entering the first and second terminal portions 63a and 64a. Thus, the first molded article 75 hardly becomes a defective product.

Therefore, in the compressor, heat generation is suppressed, power saving is enabled, excellent durability is exerted, the manufacturing cost is lowered, and a defective product is hardly produced.

Embodiment 2

Figure 10:
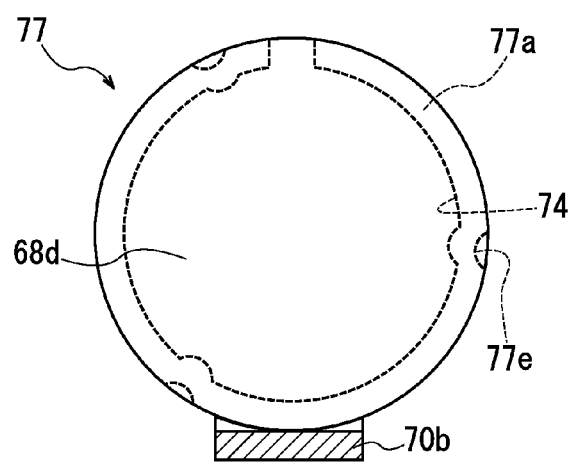
FIG. 10 is a partially-sectional rear view of a wire of a compressor according to Embodiment 2.

In a compressor according to Embodiment 2, a terminal portion 77a of each of first and second wires 77 includes three concave portions 77e that are provided radially inward to support the lid portion 68d as shown in FIG. 10. The respective concave portions 77e are apart from each other by an equal angle about the axis of the terminal portion 77a. As long as the respective concave portions 77e are apart from each other by an equal angle about the axis of the terminal portion 77a, the number of concave portions may be two, or four or more. The other components in the configuration are similar to those in Embodiment 1.

In the compressor, when the first and second wires 77 are subjected to insert molding in the insulating resin, the respective concave portions 77e support the lid portion 68d. Therefore, the insulating resin having fluidity can be reliably prevented from entering the terminal portion 77a. In particular, since the respective concave portions 77e are apart from each other by an equal angle, the lid portion 68d can be supported in a balanced manner at the lead portion end 74 of the terminal portion 77a. Therefore, when the molten resin is insert-molded, the lid portion 68d is hardly inclined, and a defective product is more hardly produced. The other effects are similar to those of Embodiment 1.

Although the present invention has been described based on Embodiments 1 and 2, it goes without saying that the present invention is not limited to Embodiments 1 and 2 described above, and may be changed and applied as appropriate without departing from the scope.

For example, the cover 11 is provided on the rear side of the second housing 1b in the compressor according to Embodiments 1 and 2. However, the cover 11 may be also provided on a top side of the second housing 1b.

The present invention can be applied to an air-conditioning apparatus of a vehicle or the like.

REFERENCE NUMBER LIST

1 . . . Housing
1a . . . First housing (housing body)
1b . . . Second housing (housing body)
3 . . . Electric driving mechanism
5 . . . Compression mechanism
7 . . . Inverter (motor drive circuit)
11 . . . Cover
11a . . . Shield cover
11b . . . Shield connector
17 . . . Accommodation chamber
61 . . . First connector portion (connector portion)
63 . . . First wire (wire)
63a . . . First terminal portion (terminal portion)
66a, 68b, 70b . . . Lead portion
66b, 68c . . . Connection portion (lead portion)
63c . . . First lid portion (lid portion)
64 . . . Second wire (wire)
64a . . . Second terminal portion (terminal portion)
64c . . . Second lid portion (lid portion)
65a . . . First resin portion
65b . . . Second resin portion
68 . . . Flat plate
67 . . . First injection mold (injection mold)
67c . . . First cavity (cavity)
69 . . . Second injection mold (injection mold)
69c . . . Second cavity (cavity)
72 . . . Pre-molded wire
70a, 77a . . . Terminal portion
68d . . . Lid portion
74 . . . Lead portion end
75 . . . First molded article
77e . . . Concave portion

The invention claimed is:

1. A motor-driven compressor comprising a housing, an electric driving mechanism, a compression mechanism that is driven by the electric driving mechanism to compress a refrigerant, and a motor drive circuit that drives the electric driving mechanism,
the housing including a housing body that accommodates the electric driving mechanism and the compression mechanism, and a cover that is fixed to the housing body and forms an accommodation chamber for accommodating the motor drive circuit between the cover and the housing body,
the cover including a connector portion which is configured to be connected with an external connector,
the connector portion including a metal wire, and an insulating resin for fixing the wire to the cover, and
the wire including a terminal portion having a cylindrical shape that is configured to be electrically connected to the external connector, and a lead portion that electrically connects the terminal portion to the motor drive circuit,
wherein the insulating resin is formed over the terminal portion and the lead portion,
the terminal portion forming a hollow tubular shape, the terminal portion having an opening at an external connector end and an opening at a lead portion end, the terminal portion and the lead portion directly connected at the lead portion end; and
a lid portion having a circular plate shape that is bent towards the opening of the lead portion end of the terminal portion to close the opening at the lead portion end, the lid portion provided integrally with the terminal portion at the lead portion end.

2. The motor-driven compressor according to claim 1, wherein the cover includes a shield cover that electromagnetically shields the accommodation chamber, and a shield connector that electromagnetically shields the inside of the connector portion, and
the insulating resin fixes the shield cover and the shield connector.

3. The motor-driven compressor according to claim 2, wherein the insulating resin includes a first resin portion that fixes the wire, and a second resin portion that is integrated with the first resin portion and forms a remaining portion.

4. The motor-driven compressor according to claim 1, wherein the terminal portion includes a plurality of concave portions that are provided in a radially inward direction of the terminal portion to support the lid portion.

5. The motor-driven compressor according to claim 4, wherein the respective concave portions are apart from each other by an equal angle about an axis of the terminal portion.

6. The motor-driven compressor according to claim 1, wherein the terminal portion is a head portion of a flat plate bent into the hollow tubular shape.

* * * * *